United States Patent
Yoon et al.

(10) Patent No.: US 12,455,629 B1
(45) Date of Patent: Oct. 28, 2025

(54) HAPTIC FEEDBACK SYSTEM AND METHOD FOR TOUCH FUNCTION ROW KEYBOARDS

(71) Applicant: Dell Products L.P., Round Rock, TX (US)

(72) Inventors: Myungkee Yoon, Cedar Park, TX (US); Isaac Hsu, Taipei (TW)

(73) Assignee: Dell Products L.P., Round Rock, TX (US)

(*) Notice: Subject to any disclaimer, the term of this patent is extended or adjusted under 35 U.S.C. 154(b) by 0 days.

(21) Appl. No.: 18/647,247

(22) Filed: Apr. 26, 2024

(51) Int. Cl.
| | |
|---|---|
| *G06F 3/01* | (2006.01) |
| *G06F 1/16* | (2006.01) |
| *G06F 3/02* | (2006.01) |
| *G06F 3/023* | (2006.01) |
| *G06F 3/0354* | (2013.01) |
| *G06F 3/038* | (2013.01) |

(52) U.S. Cl.
CPC ............ *G06F 3/016* (2013.01); *G06F 1/1662* (2013.01); *G06F 3/021* (2013.01); *G06F 3/023* (2013.01); *G06F 3/03547* (2013.01); *G06F 3/038* (2013.01)

(58) Field of Classification Search
CPC .......... G06F 3/016; G06F 3/021; G06F 3/023; G06F 3/03547; G06F 3/038; G06F 1/1662
See application file for complete search history.

(56) References Cited

U.S. PATENT DOCUMENTS

| | | | | |
|---|---|---|---|---|
| 10,719,167 | B2* | 7/2020 | Sepulveda | G06F 3/04883 |
| 10,936,073 | B1* | 3/2021 | Gajiwala | G06F 3/021 |
| 11,079,816 | B1* | 8/2021 | North | H10N 30/03 |
| 11,079,849 | B1* | 8/2021 | Knoppert | G06F 3/0219 |
| 11,093,048 | B1* | 8/2021 | Knoppert | G06F 3/0233 |
| 12,189,860 | B1* | 1/2025 | Tsen | G06F 3/0489 |
| 2002/0033795 | A1* | 3/2002 | Shahoian | G06F 3/03547 |
| | | | | 345/156 |
| 2005/0253816 | A1* | 11/2005 | Himberg | G06F 3/016 |
| | | | | 345/173 |
| 2010/0110012 | A1* | 5/2010 | Maw | G06F 3/0216 |
| | | | | 345/169 |
| 2010/0156793 | A1* | 6/2010 | Ozias | G06F 3/04886 |
| | | | | 345/173 |
| 2011/0141052 | A1* | 6/2011 | Bernstein | G06F 3/041 |
| | | | | 341/5 |
| 2012/0127093 | A1* | 5/2012 | Huang | G06F 3/038 |
| | | | | 345/173 |

(Continued)

*Primary Examiner* — Ariel A Balaoing
(74) *Attorney, Agent, or Firm* — Fogarty LLP

(57) ABSTRACT

Systems and methods described herein provide a haptic feedback system and method for touch-based function row keyboards that leverages existing components on laptop computers to provide tactile feedback for users when a touch function row key is pressed. According to one embodiment, an Information Handling System (IHS) includes a keyboard with a touch function row having multiple touch keys, a mouse pad with one or more electro-acoustic transducers, and executable instructions that receive a message indicating that one of the touch keys of the touch function row has been pressed. In response to the received message, the instructions actuate at least one of the electro-acoustic transducers to provide haptic feedback for the one pressed touch key.

20 Claims, 4 Drawing Sheets

(56) References Cited

U.S. PATENT DOCUMENTS

| | | | |
|---|---|---|---|
| 2013/0249802 A1* | 9/2013 | Yasutake | G06F 3/02 |
| | | | 345/168 |
| 2017/0010846 A1* | 1/2017 | Bernstein | G06F 3/048 |
| 2020/0193677 A1* | 6/2020 | Vaganov | A63F 13/65 |
| 2021/0240805 A1* | 8/2021 | Knoppert | G06F 3/023 |
| 2023/0126612 A1* | 4/2023 | Gajiwala | G06F 3/03547 |
| | | | 340/407.2 |

* cited by examiner

HAPTIC FEEDBACK SYSTEM AND METHOD FOR TOUCH FUNCTION ROW KEYBOARDS

BACKGROUND

As the value and use of information continues to increase, individuals and businesses seek additional ways to process and store it. One option available to users is an Information Handling System (IHS). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated.

IHSs may be general or configured for a specific user or specific use, such as financial transaction processing, airline reservations, enterprise data storage, or global communications. In addition, IHSs may include a variety of hardware and software components that may be configured to process, store, and communicate information and may include one or more computer systems, data storage systems, and networking systems.

Laptop computers are a common type of IHS that provide computing functionality in a lightweight small form factor. Laptop computers may include input devices, such as keyboards and trackpads, and may have displays to produce graphical outputs. A typical laptop computer may include a base portion and a display portion flexibly coupled to the base portion. The base portion may be configured with a keyboard and/or a mouse pad for manipulating a mouse pointer on the display. The popularity of laptop computers has continued to increase due to their increasingly smaller size and enhanced computing power.

SUMMARY

Systems and methods described herein provide a haptic feedback system and method for touch-based function row keyboards that leverages existing components on laptop computers to provide tactile feedback for users when a touch function row key is pressed. According to one embodiment, an Information Handling System (IHS) includes a keyboard with a touch function row having multiple touch keys, a mouse pad with one or more electro-acoustic transducers, and executable instructions that receive a message indicating that one of the touch keys of the touch function row has been pressed. In response to the received message, the instructions actuate at least one of the electro-acoustic transducers to provide haptic feedback for the one pressed touch key.

According to another embodiment, a haptic feedback method for a touch function row of a keyboard includes the steps of receiving a message indicating that one of a plurality of touch keys of a touch function row has been pressed, and in response to the received message, actuate at least one of a plurality of electro-acoustic transducers of a mouse pad to provide haptic feedback for the one pressed touch key.

According to yet another embodiment, a laptop computer includes a keyboard with a touch function row having multiple touch keys, a mouse pad with one or more electro-acoustic transducers, and computer-executable instructions to receive a message indicating that one of the touch keys of the touch function row has been pressed, and in response to the received message, energize at least one of the electro-acoustic transducers to provide haptic feedback for the one pressed touch key.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

Figure 1:
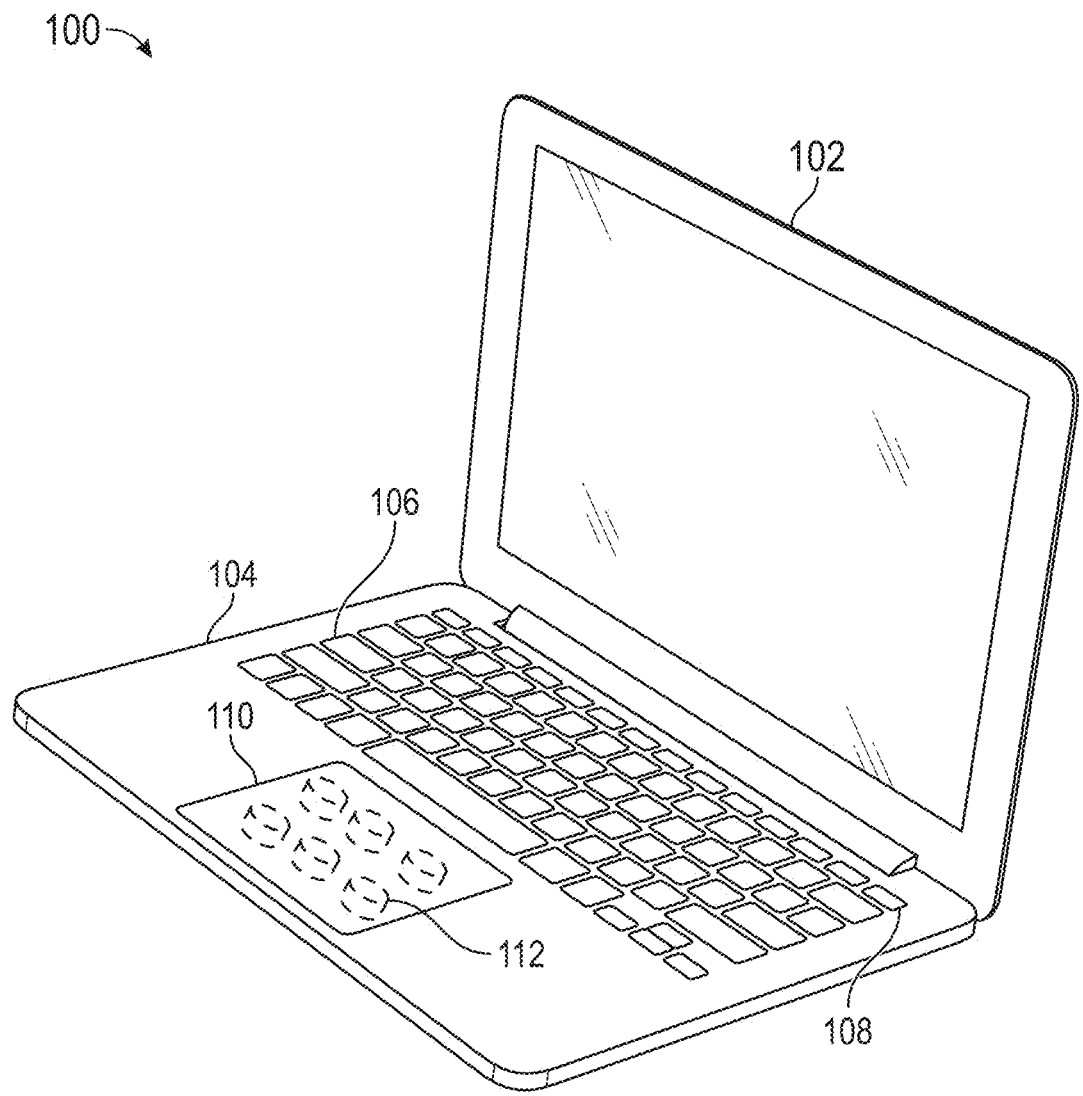
FIG. 1 illustrates an example laptop computer configured with a touch-based function row keyboard that is implemented with a haptic feedback system according to one embodiment of the present disclosure.

The present disclosure is described with reference to the attached figures. The figures are not drawn to scale, and they are provided merely to illustrate the disclosure. Several aspects of the disclosure are described below with reference to example applications for illustration. It should be understood that numerous specific details, relationships, and methods are set forth to provide an understanding of the disclosure. The present disclosure is not limited by the illustrated ordering of acts or events, as some acts may occur in different orders and/or concurrently with other acts or events. Furthermore, not all illustrated acts or events are required to implement a methodology in accordance with the present disclosure.

An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

The keyboard, the mouse, the touchpad and the touchscreen are among the most commonly used devices for interacting with computers. With regard to laptop computers, the keyboard and mouse pad are typically configured on its base portion so that users can interact with their laptop computers via a display portion pivotally coupled to the base portion. In an effort to continually reduce the size and weight of laptop computers, vendors have designed keyboards with increasingly lower profiles so that their base portion can be made as thin as possible. One new particular type of design change has been to make the keys of the function row (e.g., escape key, F1-F12 keys, delete key, insert key, etc.) solely touch-based (e.g., capacitive-based or resistive-based touch pads) in order to further reduce the profile of the keyboard. Keyboards with function rows of this type may be commonly referred to as Touch Function Row (TFR) keyboards.

Nevertheless, touch-based function row keyboards have encountered certain drawbacks. For example, touch function row keys often do not provide a tactile sensation for the user in the same way that a mechanical keys do. Furthermore, scenarios exist where the user would like to press a touch function row key multiple times; but little or no feedback has been provided using conventional touch function row keys, and for this reason, implementation of touch-based function row keyboards has heretofore not been well received by consumers. As will be described in detail herein below, embodiments of the present disclosure provide a haptic feedback system and method for touch-based function row keyboards that leverages existing components on laptop computers to provide tactile feedback for users when a touch function row key is pressed.

FIG. 1 illustrates an example laptop computer 100 configured with a touch-based function row keyboard 102 that is implemented with a haptic feedback system according to one embodiment of the present disclosure. The laptop computer 100 includes a display portion 102 pivotally coupled to a base portion 104. A touch function row keyboard 106 is configured on the base portion 104 and has a touch-based function row 108 positioned along the inner edge of the base portion 104. A mouse pad 110 is also configured on the base portion 104 and includes multiple piezo-electric transducers 112 that generate a tactile sensation for the user when they manipulate or otherwise interact with the mouse pad 110. As will be described in detail herein below, embodiments of the present disclosure provide a system for generating a tactile sensation using the piezo-electric transducers 112 configured within the mouse pad 110 whenever a key of the touch function row 108 is pressed by a user.

Many mouse pads deployed on today's laptop computers are implemented with piezo-electric transducers 112 to enhance their look and feel via providing tactile feedback for the user when using the mouse pad. Moreover, trends in mouse pad design have removed the left button and right button typically found on older mouse pad designs, and replaced them with pressure sensitive switches underneath the surface of the mouse pad 110. Thus, when the user performs either a left or right button selection operation, the piezo-electric transducers 112 may vibrate to indicate to the user that the pad was successfully pressed. The piezo-electric transducers 112 are mounted underneath and physically coupled to the mouse pad 110 and may generate vibration and/or an audible sound to provide a tactile sensation to the user of the laptop computer 100. Tests have shown that tactile feedback provided by piezo-electric transducers 112 has enhanced user experience by increasing the level of sensory interaction with the laptop computer.

The touch function row 108 includes multiple touch-based keys that may be actuated by being touched by a finger of the user. That is, the touch-based keys typically do not have moving parts; rather, they are configured with touch sensitive circuitry (e.g., capacitive touch sensor, resistive touch sensor, etc.) that detects when the touch-based keys are touched to generate appropriate signals that are sent to logic within the laptop computer 100. To provide a particular example, a capacitive touch sensor circuit may be provided for each touch-based key, and physically coupled to the lower surface of the base portion 104.

As mentioned previously, While the touch function row 108 may provide a relatively low profile that allows the laptop computer 100 to be relative thinner than other laptop computers configured with conventional switch-based touch function row keys, their lack of tactile feedback has, in many cases, resulted in a reduction in positive user experience by users. Embodiments of the present disclosure leverages the use of piezo-electric transducers 112 conventionally configured in mouse pads 110 to provide the tactile sensation when the keys of the touch function row 108 are pressed, thus improving user experience for users in some embodiments.

Figure 2:
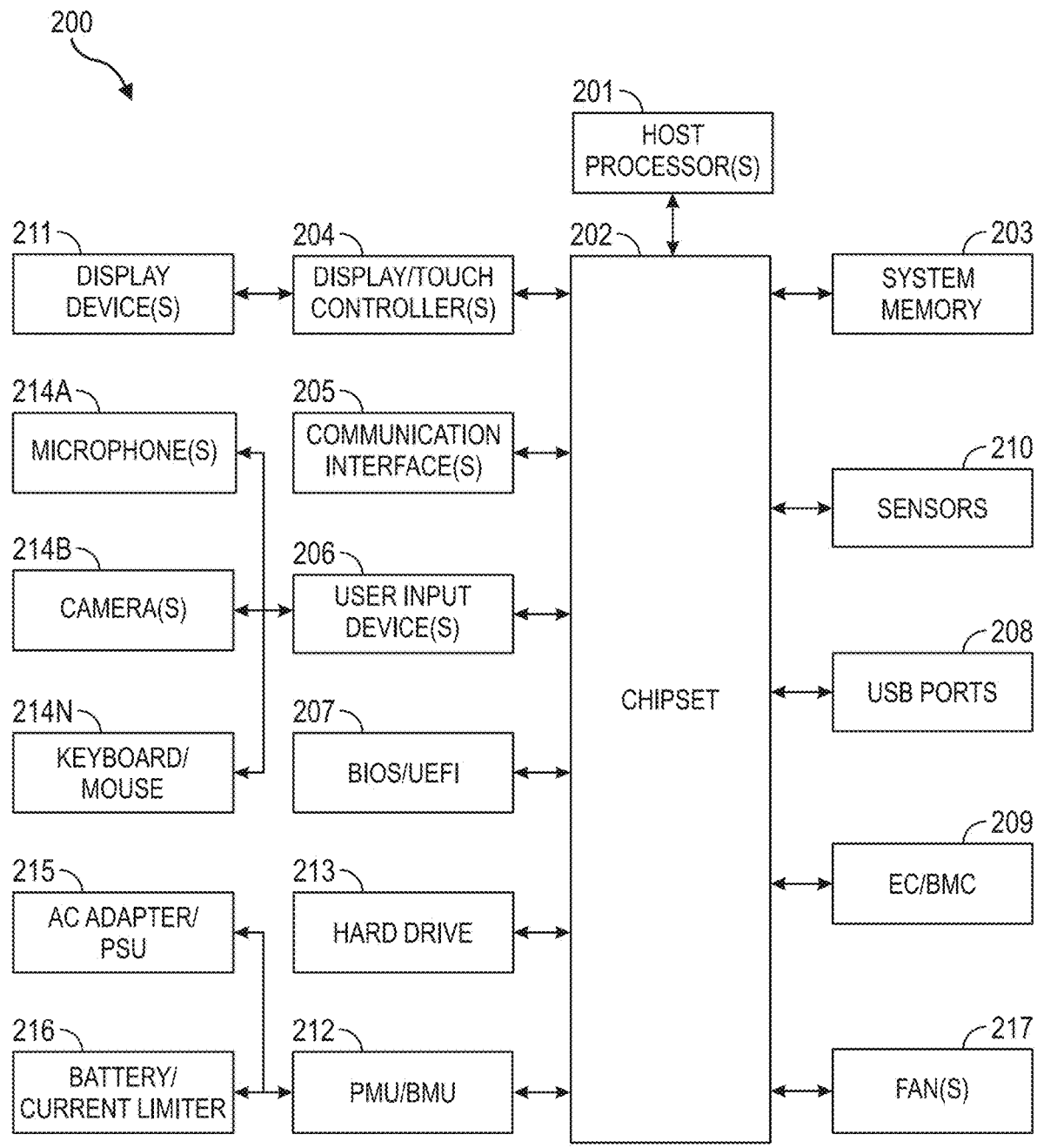
FIG. 2 is a block diagram of certain components of an IHS, which may be used to implement embodiments of the haptic feedback system of FIG. 1.

FIG. 2 is a block diagram of certain components of an IHS 200, which may be used to implement embodiments of the haptic feedback system of FIG. 1. As depicted, IHS 200 includes host processor(s) 201. In various embodiments, IHS 200 may be a single-processor system, a multi-processor system including two or more processors, and/or a heterogeneous computing platform. Host processor(s) 201 may include any processor capable of executing program instructions, such as a PENTIUM processor, or any general-purpose or embedded processor implementing any of a variety of Instruction Set Architectures (ISAs), such as a x86 or a Reduced Instruction Set Computer (RISC) ISA (e.g., POWERPC, ARM, SPARC, MIPS, etc.). In some embodiments, the IHS 200 may be used to provide any suitable cloud provider resource, such as a Virtual Private Cloud (VPC), Elastic Compute Cloud (EC2), IAM resources, and/or Pivotal Container Services (PKS).

IHS 200 includes chipset 202 coupled to host processor(s) 201. Chipset 202 may provide host processor(s) 201 with access to several resources. In some cases, chipset 202 may utilize a QuickPath Interconnect (QPI) bus to communicate with host processor(s) 201.

Chipset 202 may also be coupled to communication interface(s) 205 to enable communications between IHS 200 and various wired and/or wireless networks, such as Ethernet, WiFi, BLUETOOTH (BT), cellular or mobile networks (e.g., Code-Division Multiple Access or "CDMA," Time-Division Multiple Access or "TDMA," Long-Term Evolution or "LTE," etc.), satellite networks, or the like.

Communication interface(s) 205 may also be used to communicate with certain peripherals devices (e.g., BT speakers, microphones, headsets, etc.). Moreover, communication interface(s) 205 may be coupled to chipset 202 via a Peripheral Component Interconnect Express (PCIe) bus, or the like.

Chipset 202 may be coupled to display/touch controller(s) 204, which may include one or more Graphics Processor Units (GPUs) on a graphics bus, such as an Accelerated Graphics Port (AGP) or PCIe bus. As shown, display/touch controller(s) 204 provide video or display signals to one or more display device(s) 211.

Display device(s) 211 may include Liquid Crystal Display (LCD), Light Emitting Diode (LED), organic LED (OLED), or other thin film display technologies. Display device(s) 211 may include a plurality of pixels arranged in a matrix, configured to display visual information, such as text, two-dimensional images, video, three-dimensional images, etc. In some cases, display device(s) 211 may be provided as a single continuous display, or as two or more discrete displays.

Chipset 202 may provide host processor(s) 201 and/or display/touch controller(s) 204 with access to system memory 203. In various embodiments, system memory 203 may be implemented using any suitable memory technology, such as static RAM (SRAM), dynamic RAM (DRAM) or magnetic disks, or any nonvolatile/Flash-type memory, such as a solid-state drive (SSD) or the like.

Chipset 202 may also provide host processor(s) 201 with access to one or more Universal Serial Bus (USB) ports 208, to which one or more peripheral devices may be coupled (e.g., integrated or external webcams, microphones, speakers, etc.).

Chipset 202 may further provide host processor(s) 201 with access to one or more hard disk drives, solid-state drives, optical drives, or other removable-media drives 213.

Chipset 202 may also provide access to one or more user input devices 206, for example, using a super I/O controller or the like. Examples of user input devices 206 may include, but are not limited to, microphone(s) 214A, camera(s) 214B, and keyboard/mouse 214N. Other user input devices 206 may include a touchpad, trackpad, stylus or active pen, totem, etc.

Each user input devices 206 may include a respective controller (e.g., a touchpad may have its own touchpad controller) that interfaces with chipset 202 through a wired or wireless connection (e.g., via communication interfaces(s) 205). In some cases, chipset 202 may also provide access to one or more user output devices (e.g., video projectors, paper printers, 3D printers, loudspeakers, audio headsets, Virtual/Augmented Reality (VR/AR) devices, etc.). In certain embodiments, chipset 202 may further provide an interface for communications with hardware sensors 210.

Sensors 210 may be disposed on or within the chassis of IHS 200, or otherwise coupled to IHS 200, and may include, but are not limited to: electric, magnetic, radio, optical (e.g., camera, webcam, etc.), infrared, thermal (e.g., thermistors etc.), force, pressure, acoustic (e.g., microphone), ultrasonic, proximity, position, deformation, bending, direction, movement, velocity, rotation, gyroscope, Inertial Measurement Unit (IMU), and/or acceleration sensor(s).

The Unified Extensible Firmware Interface (UEFI) was designed as a successor to BIOS. As a result, many modern IHSs utilize UEFI in addition to or instead of a BIOS. As used herein, BIOS 207 is intended to also encompass a UEFI component.

Embedded Controller (EC) or Baseboard Management Controller (BMC) 209 is operational from the very start of each IHS power reset and handles various tasks not ordinarily handled by host processor(s) 201. Examples of these operations may include, but are not limited to: receiving and processing signals from a keyboard or touchpad, as well as other buttons and switches (e.g., power button, laptop lid switch, etc.), receiving and processing thermal measurements (e.g., performing fan control, CPU and GPU throttling, and emergency shutdown), controlling indicator LEDs (e.g., caps lock, scroll lock, number lock, battery, power, wireless LAN, sleep, etc.), managing PMU/BMU 212, alternating current (AC) adapter/Power Supply Unit (PSU) 215 and/or battery/current limiter 216, allowing remote diagnostics and remediation over network(s), etc. For example, EC/BMC 209 may implement operations for interfacing with power adapter/PSU 215 in managing power for IHS 200. Such operations may be performed to determine the power status of IHS 200, such as whether IHS 200 is operating from AC adapter/PSU 215 and/or battery 216.

Firmware instructions utilized by EC/BMC 209 may also be used to provide various core operations of IHS 200, such as power management and management of certain modes of IHS 200 (e.g., turbo modes, maximum operating clock frequencies of certain components, etc.). In addition, EC/BMC 209 may implement operations for detecting certain changes to the physical configuration or posture of IHS 200. For instance, when IHS 200 is embodied as a 2-in-1 laptop/tablet form factor, EC/BMC 209 may receive inputs from a lid position or hinge angle sensor 210, and it may use those inputs to determine: whether the two sides of IHS 200 have been latched together to a closed position or a tablet position, the magnitude of a hinge or lid angle, etc. In response to these changes, the EC may enable or disable certain features of IHS 200 (e.g., front or rear facing camera, etc.).

In some cases, EC/BMC 209 may be configured to identify any number of IHS postures, including, but not limited to: laptop, stand, tablet, tent, or book. For example, when display(s) 211 of IHS 200 is open with respect to a horizontal keyboard portion, and the keyboard is facing up, EC/BMC 209 may determine IHS 200 to be in a laptop posture. When display(s) 211 of IHS 200 is open with respect to the horizontal keyboard portion, but the keyboard is facing down (e.g., its keys are against the top surface of a table), EC/BMC 209 may determine IHS 200 to be in a stand posture.

When the back of display(s) 211 is closed against the back of the keyboard portion, EC/BMC 209 may determine IHS 200 to be in a tablet posture. When IHS 200 has two display(s) 211 open side-by-side, EC/BMC 209 may determine IHS 200 to be in a book posture. When IHS 200 has two displays open to form a triangular structure sitting on a horizontal surface, such that a hinge between the displays is at the top vertex of the triangle, EC/BMC 209 may determine IHS 200 to be in a tent posture. In some implementations, EC/BMC 209 may also determine if display(s) 211 of IHS 200 are in a landscape or portrait orientation. In some cases, EC/BMC 209 may be installed as a Trusted Execution Environment (TEE) component to the motherboard of IHS 200.

Additionally, or alternatively, EC/BMC 209 may be configured to calculate hashes or signatures that uniquely identify individual components of IHS 200. In such scenarios, EC/BMC 209 may calculate a hash value based on the configuration of a hardware and/or software component coupled to IHS 200. For instance, EC/BMC 209 may calculate a hash value based on all firmware and other code or settings stored in an onboard memory of a hardware component.

Hash values may be calculated as part of a trusted process of manufacturing IHS 200 and may be maintained in secure storage as a reference signature. EC/BMC 209 may later recalculate the hash value for a component, compare it against the reference hash value to determine if any modifications have been made to the component, thus indicating that the component has been compromised. In this manner, EC/BMC 209 may validate the integrity of hardware and software components installed in IHS 200.

In various embodiments, IHS 200 may be coupled to an external power source (e.g., AC outlet or mains) through an AC adapter/PSU 215. AC adapter/PSU 215 may include an adapter portion having a central unit (e.g., a power brick, wall charger, or the like) configured to draw power from an AC outlet via a first electrical cord, convert the AC power to direct current (DC) power, and provide DC power to IHS 200 via a second electrical cord.

Additionally, or alternatively, AC adapter/PSU 215 may include an internal or external power supply portion (e.g., a switching power supply, etc.) connected to the second electrical cord and configured to convert AC to DC. AC adapter/PSU 215 may also supply a standby voltage, so that most of IHS 200 can be powered off after preparing for hibernation or shutdown, and powered back on by an event (e.g., remotely via wake-on-LAN, etc.). In general, AC adapter/PSU 215 may have any specific power rating, measured in volts or watts, and any suitable connectors.

IHS 200 may also include internal or external battery 216. Battery 216 may include, for example, a Lithium-ion or Li-ion rechargeable device capable of storing energy sufficient to power IHS 200 for an amount of time, depending upon the IHS's workloads, environmental conditions, etc. In some cases, a battery pack may also contain temperature sensors, voltage regulator circuits, voltage taps, and/or charge-state monitors. For example, battery 216 may include a current limiter, or the like.

In some embodiments, battery 216 may be configured to detect overcurrent or undervoltage conditions using Limits Management Hardware (LMH). As used herein, the term "overcurrent" refers to a condition in an electrical circuit that arises when a normal load current is exceeded (e.g., overloads, short circuits, etc.). Conversely, the term "undervoltage" refers to a condition (e.g., "brownout") where the applied voltage drops to X % of rated voltage (e.g., 90%), or less, for a predetermined amount of time (e.g., 1 minute).

Power Management Unit (PMU) 212 governs power functions of IHS 200, including AC adapter/PSU 215 and battery 216. For example, PMU 212 may be configured to: monitor power connections and battery charges, charging batteries, control power to other components, devices, or ICs, shut down components when they are left idle, control sleep and power functions (On and Off), managing interfaces for built-in keypad and touchpads, regulate real-time clocks (RTCs), etc.

In some implementations, PMU 212 may include one or more Power Management Integrated Circuits (PMICs) configured to control the flow and direction or electrical power in IHS 200. Particularly, a PMIC may be configured to perform battery management, power source selection, voltage regulation, voltage supervision, undervoltage protection, power sequencing, and/or charging operations. It may also include a DC-to-DC converter to allow dynamic voltage scaling, or the like.

Figure 3:
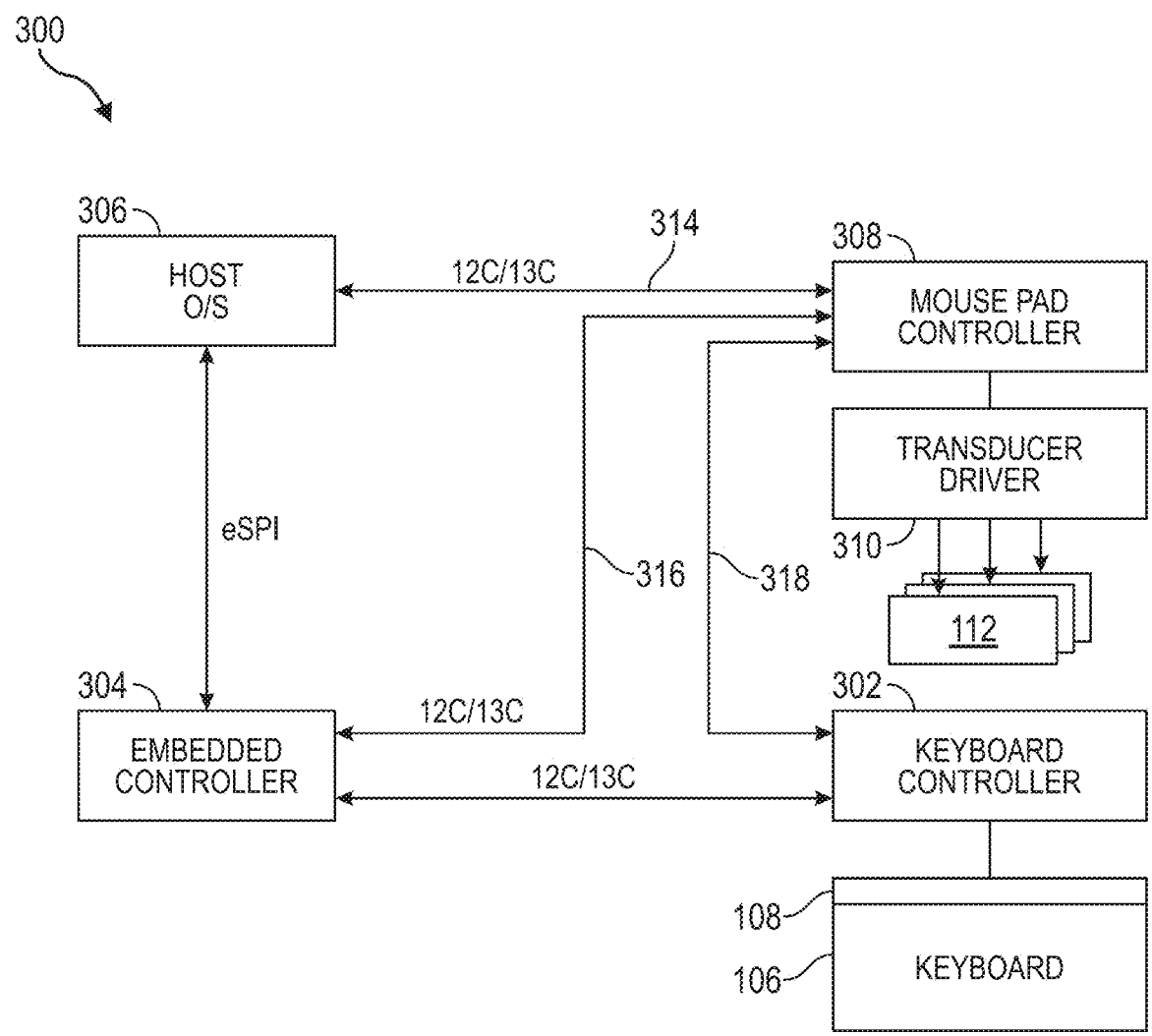
FIG. 3 is a signaling diagram illustrating several components of the laptop computer that may be used to implement the haptic feedback system according to one embodiment of the present disclosure.

Additionally, or alternatively, PMU 212 may include a Battery Management Unit (BMU) (referred to collectively as "PMU/BMU 212"). AC adapter/PSU 215 may be removably coupled to a battery charge controller within PMU/BMU 212 to provide IHS 200 with a source of DC power from battery cells within battery 216 (e.g., a lithium ion (Li-ion) or nickel metal hydride (NiMH) battery pack including one or more rechargeable batteries). PMU/BMU 212 may include non-volatile memory and it may be configured to collect and store battery status, charging, and discharging information, and to provide that information to other IHS components, such as, for example devices within heterogeneous computing platform 300 (FIG. 3).

Examples of information collected and stored in a memory within PMU/BMU 212 may include, but are not limited to: operating conditions (e.g., battery operating conditions including battery state information such as battery current amplitude and/or current direction, battery voltage, battery charge cycles, battery state of charge, battery state of health, battery temperature, battery usage data such as charging and discharging data; and/or IHS operating conditions such as processor operating speed data, system power management and cooling system settings, state of "system present" pin signal), environmental or contextual information (e.g., such as ambient temperature, relative humidity, system geolocation measured by GPS or triangulation, time and date, etc.), and BMU events.

Examples of BMU events may include, but are not limited to acceleration or shock events, system transportation events, exposure to elevated temperature for extended time periods, high discharge current rate, combinations of battery voltage, battery current and/or battery temperature (e.g., elevated temperature event at full charge and/or high voltage causes more battery degradation than lower voltage), etc.

In some embodiments, power draw measurements may be conducted with control and monitoring of power supply via PMU/BMU 212. Power draw data may also be monitored with respect to individual components or devices of IHS 200. Whenever applicable, PMU/BMU 212 may administer the execution of a power policy, or the like.

IHS 200 may also include one or more fans 217 configured to cool down one or more components or devices of IHS 200 disposed inside a chassis, case, or housing. Fan(s) 217 may include any fan inside, or attached to, IHS 200 and used for active cooling. Fan(s) 217 may be used to draw cooler air into the case from the outside, expel warm air from inside, and/or move air across a heat sink to cool a particular IHS component. In various embodiments, both axial and sometimes centrifugal (blower/squirrel-cage) fans may be used.

In other embodiments, IHS 200 may not include all the components shown in FIG. 2. In other embodiments, IHS 200 may include other components in addition to those that are shown in FIG. 2. Furthermore, some components that are represented as separate components in FIG. 2 may instead be integrated with other components, such that all or a portion of the operations executed by the illustrated components may instead be executed by the integrated component.

For example, in various embodiments described herein, host processor(s) 201 and/or other components of IHS 200 (e.g., chipset 202, display/touch controller(s) 204, communication interface(s) 205, EC/BMC 209, etc.) may be replaced by discrete devices within a heterogeneous computing platform. As such, IHS 200 may assume different form factors including, but not limited to: servers, workstations, desktops, laptops, appliances, video game consoles, tablets, smartphones, etc.

FIG. 3 is a signaling diagram 300 illustrating several components of the laptop computer 100 that may be used to implement the haptic feedback system according to one embodiment of the present disclosure. The signaling diagram 300 includes a keyboard controller 302 coupled to the keyboard 106 and an embedded controller 304. The embedded controller 304, in turn, is coupled to a host Operating System (OS) 306 of the laptop computer 100, and a piezoelectric controller 308 that controls the operation of the electro-acoustic transducers 112 via a piezo-electric driver 310. The embedded controller 304, for example, may be at least somewhat similar to the EC/BMC 209 described above with reference to FIG. 2.

As shown, the keyboard controller 302 is coupled to the embedded controller 304 and the mouse pad controller 308 is coupled to the host OS 306 and embedded controller 304 via I2C/I3C communication links, while the embedded controller 304 is coupled to the host OS 306 via an eSPI communication link. Nevertheless, is should be appreciated that the components as shown may communicate with one another using any suitable communication protocol. For example, the embedded controller 304 may communicate with the host OS 306 using a I2C or I3C communication protocol. Additionally, although the present embodiment cites piezo-electric transducers, it should be appreciated that in other embodiments, any suitable type of electro-acoustic transducer(s) may be used, such as electro-magnetic transducers.

The keyboard controller 302 may communicate with the mouse pad controller 308 using any suitable communication path. For example, the keyboard controller 302 may communicate with the mouse pad controller 308 via communication path 314 that goes through host OS 306. As another example, the keyboard controller 302 may communicate directly with the mouse pad controller 308 via communication path 316 that goes through the embedded controller 304. As yet another example, the keyboard controller 302 may communicate with the mouse pad controller 308 via communication path 318 independently of the host OS 306 or embedded controller 209.

The keyboard controller 302 receives signals from and controls the operation of the keyboard 106. For example, the keyboard controller 302 may be responsive to a key press event in which a key of the touch function row 108 was pressed to generate a message indicating which key was pressed and sending the message to the embedded controller 304. Once the embedded controller 304 receives the message, it may either forward it to the host OS 306 for further processing, or it may forward it directly to the mouse pad controller 308. For example, the embedded controller 304 may forward the message to the host OS 306 when an application running on the laptop computer 100 may have instructions for adjusting how the electro-acoustic transducers 112 are actuated, such as by adjusting the volume and/or the vibration level of the electro-acoustic transducers 112, the frequency at which the electro-acoustic transducers 112 are actuated, and the like. For cases where no manipulation of the operation of the electro-acoustic transducers 112 by the host OS 306 is needed, the embedded controller 304 may forward the message directly to the mouse pad controller 308 so that the host OS 306 is not burdened with the task.

The mouse pad controller 308 controls the operation of the electro-acoustic transducers 112 via a transducer driver 310. For example, the transducer driver 310 may include drive circuitry for actuating the electro-acoustic transducers 112, such as by generating an oscillating electrical signal at a certain frequency (e.g., 1 Kilo-Hertz) for a specified period of time (e.g., 200 milliseconds) based upon instructions received from the mouse pad controller 308. The mouse pad controller 308 may control the transducer driver 310 to cause one or multiple electro-acoustic transducers 112 to vibrate. For example, the mouse pad controller 308 may adjust how much audible volume and/or vibrational energy is imparted onto the mouse pad 110 by selecting how many electro-acoustic transducers 112 are simultaneously activated.

Figure 4:
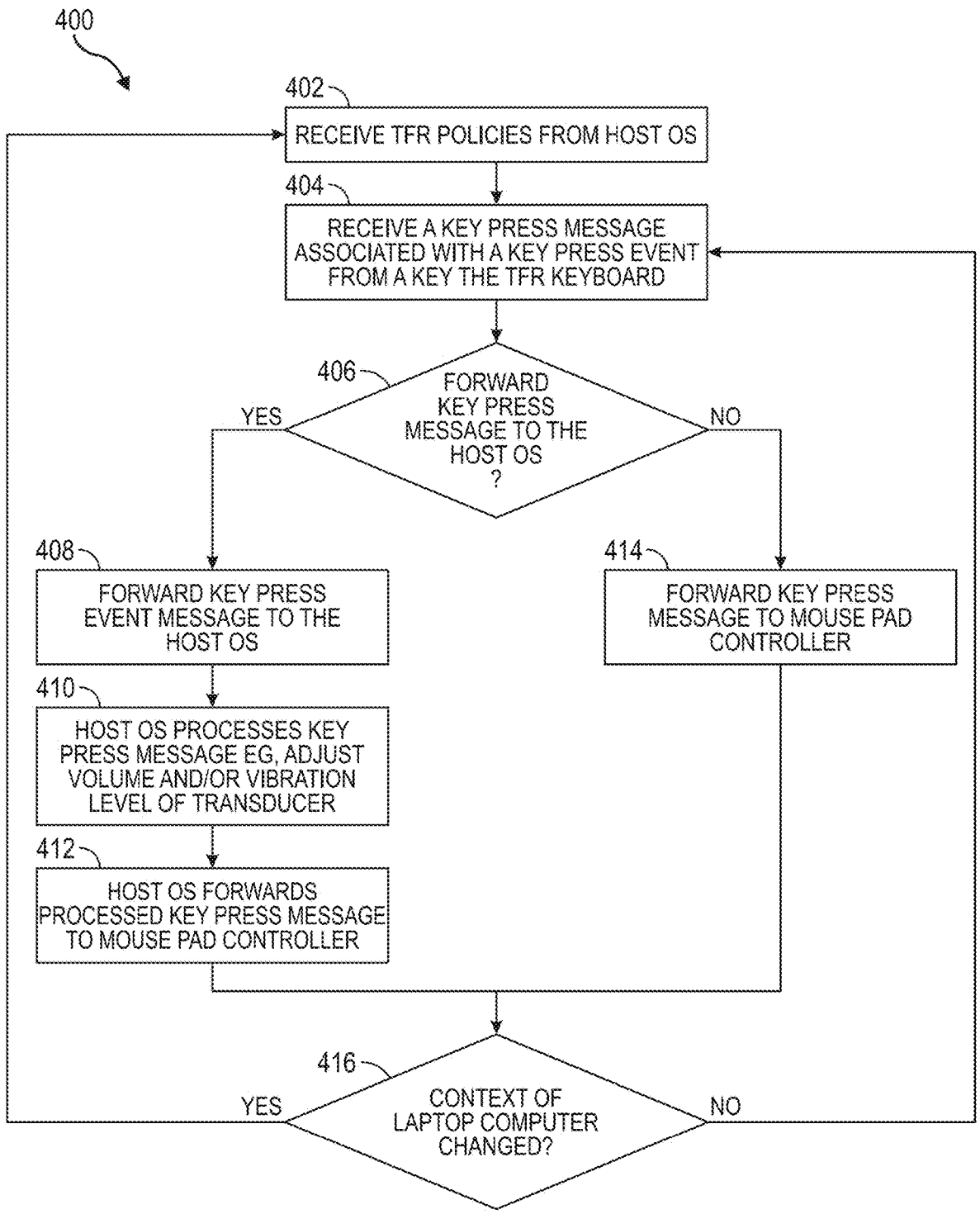
FIG. 4 illustrates an example haptic feedback method that may be performed to provide haptic feedback for the keys of a touch function row of a keyboard according to one embodiment of the present disclosure.

FIG. 4 illustrates an example haptic feedback method 400 that may be performed to provide haptic feedback for the keys of a touch function row 108 according to one embodiment of the present disclosure. The method 400 may be performed at any time. In one embodiment, the method 400 may be performed each time the laptop computer 100 is started (re-booted) and may continually be performed as long as it remains running. Additionally or alternatively, the haptic feedback method 400 may be performed at least in part by the components of the haptic feedback system as described above with reference to FIG. 3.

Initially at step 402, the embedded controller 304 receives touch function row policies from the host OS. When the laptop computer 100 is re-booted for example, the host OS 306 may communicate with any actively running applications to identify any special operations (e.g., hot keys, custom key mapping, etc.) to be applied to certain keys of the touch function row 108. Once the special operations are identified, the host OS 306 may send information associated with any special operations as policies to the embedded controller 304. The policies may include instructions about key actuation events associated with which keys are to be forwarded to the host OS for further processing. For example, when a word processing application is launched on the host OS 306, it may send a policy to the embedded controller 304 indicating that whenever the 'F7' function key is actuated, forward the message to the host OS for further processing. In one embodiment, the policies may include what type of vibration or sound to generate. For example, the policies may include instructions to generate one type of vibration or sound for a normal key press event, and generate another different vibration or sound for an invalid key press event (e.g., two or more key press events are simultaneously detected, an invalid combination of key press events, a key that has not been mapped to any particular function, etc.).

At this point the haptic feedback method 400 is configured for receiving and processing key press events associated with the keys of the touch function row 108. At step 404, the embedded controller 304 receives a key press message associated with a key press event from a key the touch function row 108. The embedded controller 304 then at step 406, determines whether to forward the key press message to the host OS. The embedded controller 304 may determine this based upon the policies received previously at step 402. If the host OS 306 is to process the key press message, processing continues at step 408 in which the key press message is sent through communication path 314; otherwise, processing continues at step 414 in which the key press message is sent through either communication path 316 or 318.

At step 408, the embedded controller 304 forwards the key press message to the host OS 306. The host OS 306 processes the key press message at step 410. For example, the host OS 306 may identify that the key associated with the key press message has been assigned to be a hotkey by an actively running application, communicate with the application to obtain any adjustment information (e.g., changes in amplitude, frequency, custom sound or vibration to generate, etc.), and add the adjustment information to the key press message. Thereafter at step 412, the host OS 306 forwards the processed key press message to the piezo-electric touchpad controller 308, which communicates with the transducer driver 310 to actuate the piezo-electric transducers 112.

Step 414 is performed when the host OS 306 is not configured to further process the received key press message. At step 414, the host OS 306 forwards the key press message to the mouse pad controller 308, which communicates with the transducer driver 310 to actuate the piezo-electric transducers 112.

At step 416, the method 400 determines whether a context of the laptop computer 100 has changed. For example, the context of the laptop computer 100 may include changes to which applications are currently being executed on the laptop computer 100. If so, the method 400 may continue operation at step 402 to receive any changes to touch function row policies that may have changed due to the change in context. If, however, no changes in context have been detected, processing may continue at step 404 to receive and process the next key press message associated with a key press event from the touch function row 108.

The steps of the aforedescribed process may be continually performed as long as the laptop computer 100 is on to provide haptic feedback for the keys of the touch function row 108. Nevertheless, when use of the haptic feedback method 400 is no longer needed or desired, the process ends.

Although FIG. 4 describes an example method 400 that may be performed to provide haptic feedback for the keys of the touch function row 108, the features of the method 400 may be embodied in other specific forms without deviating from the spirit and scope of the present disclosure. For example, the method 400 may perform additional, fewer, or different operations than those described in the present examples. For another example, the method 400 may be performed in a sequence of steps different from that described above. As yet another example, certain steps of the method 400 may be performed by other components than those described above.

In accordance with the foregoing, embodiments of the present systems and methods provide secure temporary privileged access to nodes in a cluster. To implement various operations described herein, computer program code (i.e., program instructions for carrying out these operations) may be written in any combination of one or more programming languages, including an object-oriented programming language such as Java, Smalltalk, Python, C++, or the like, conventional procedural programming languages, such as the "C" programming language or similar programming languages, or any of machine learning software. These program instructions may also be stored in a computer readable storage medium that can direct a computer system, other programmable data processing apparatus, controller, or other device to operate in a particular manner, such that the instructions stored in the computer readable medium produce an article of manufacture including instructions which implement the operations specified in the block diagram block or blocks.

Program instructions may also be loaded onto a computer, other programmable data processing apparatus, controller, or other device to cause a series of operations to be performed on the computer, or other programmable apparatus or devices, to produce a computer implemented process such that the instructions upon execution provide processes for implementing the operations specified in the block diagram block or blocks.

Modules implemented in software for execution by various types of processors may, for instance, include one or more physical or logical blocks of computer instructions, which may, for instance, be organized as an object or procedure. Nevertheless, the executables of an identified module need not be physically located together but may include disparate instructions stored in different locations which, when joined logically together, include the module and achieve the stated purpose for the module. Indeed, a module of executable code may be a single instruction, or many instructions, and may even be distributed over several different code segments, among different programs, and across several memory devices.

Similarly, operational data may be identified and illustrated herein within modules and may be embodied in any suitable form and organized within any suitable type of data structure. Operational data may be collected as a single data set or may be distributed over different locations including over different storage devices.

Reference is made herein to "configuring" a device or a device "configured to" perform some operation(s). This may include selecting predefined logic blocks and logically associating them. It may also include programming computer software-based logic of a retrofit control device, wiring discrete hardware components, or a combination thereof. Such configured devices are physically designed to perform the specified operation(s).

Various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs.

As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

The invention claimed is:

1. An Information Handling System (IHS) comprising:
 a keyboard comprising a touch function row having a plurality of touch keys;
 a mouse pad comprising one or more electro-acoustic transducers; and
 at least one memory coupled to at least one processor, the at least one memory having program instructions stored thereon that, upon execution by the at least one processor, cause the instructions to:
  receive a message indicating that one of the touch keys of the touch function row has been pressed; and
  in response to the received message, actuate at least one of the electro-acoustic transducers to provide haptic feedback for the one pressed touch key.

2. The IHS of claim 1, wherein the electro-acoustic transducers comprise a plurality of piezo-electric transducers.

3. The IHS of claim 1, wherein the IHS comprises a laptop computer.

4. The IHS of claim 3, wherein the instructions are executed by an embedded controller configured in the laptop computer.

5. The IHS of claim 4, wherein the program instructions, upon execution, further cause the embedded controller to communicate with a keyboard controller of the keyboard and a mouse pad controller of the electro-acoustic transducers using at least one of an I2C communication link or an I3C communication link.

6. The IHS of claim 1, wherein the program instructions, upon execution, further cause the IHS to, in response to the received message, forward the message to a controller of the electro-acoustic transducers.

7. The IHS of claim 1, wherein the program instructions, upon execution, further cause the IHS to, in response to the received message, forward the message to the host OS of the laptop computer, wherein the host OS is configured to adjust how the electro-acoustic transducers are pressed.

8. The IHS of claim 1, wherein the electro-acoustic transducers are configured to provide haptic feedback for operations performed on the mouse pad.

9. The laptop computer of claim 1, wherein the electro-acoustic transducers are configured to provide haptic feedback for operations performed on the mouse pad.

10. A haptic feedback method for a touch function row of a keyboard, the haptic feedback method comprising:
    receiving a message indicating that one of a plurality of touch keys of a touch function row has been pressed; and
    in response to the received message, actuating at least one of a plurality of electro-acoustic transducers of a mouse pad to provide haptic feedback for the one pressed touch key.

11. The haptic feedback method of claim 10, wherein the IHS comprises a laptop computer.

12. The haptic feedback method of claim 11, wherein the instructions are executed by an embedded controller configured in the laptop computer.

13. The haptic feedback method of claim 12, wherein the program instructions, upon execution, further cause the embedded controller to communicate with a keyboard controller of the keyboard and a mouse pad controller of the electro-acoustic transducers using at least one of an I2C communication link or an I3C communication link.

14. The haptic feedback method of claim 10, wherein the program instructions, upon execution, further cause IHS to, in response to the received message, forward the message to a controller of the electro-acoustic transducers.

15. The haptic feedback method of claim 10, wherein the program instructions, upon execution, further cause IHS to, in response to the received message, forward the message to the host OS of the laptop computer, wherein the host OS is configured to adjust how the electro-acoustic transducers are pressed.

16. The haptic feedback method of claim 10, wherein the electro-acoustic transducers are configured to provide haptic feedback for operations performed on the mouse pad.

17. A laptop computer comprising:
    a keyboard comprising a touch function row having a plurality of touch keys;
    a mouse pad comprising one or more electro-acoustic transducers;
    at least one memory coupled to at least one processor, the at least one memory having program instructions stored thereon that, upon execution by the at least one processor, cause the instructions to:
    receive a message indicating that one of the touch keys of the touch function row has been pressed; and
    in response to the received message, energize at least one of the electro-acoustic transducers to provide haptic feedback for the one pressed touch key.

18. The laptop computer of claim 17, wherein the instructions are executed by an embedded controller configured in the laptop computer.

19. The laptop computer of claim 17, wherein the program instructions, upon execution, further cause IHS to, in response to the received message, forward the message to a controller of the piezo-electric transducer.

20. The laptop computer of claim 17, wherein the program instructions, upon execution, further cause IHS to, in response to the received message, forward the message to the host OS of the laptop computer, wherein the host OS is configured to adjust how the electro-acoustic transducers are pressed.

* * * * *